United States Patent [19]

Yang

[11] 4,039,830

[45] Aug. 2, 1977

[54] ELECTROSTATIC X-RAY IMAGE RECORDING DEVICE WITH MESH-BASE PHOTOCATHODE PHOTOELECTRON DISCRIMINATOR MEANS

[75] Inventor: Kei-Hsiung Yang, Schenectady, N.Y.

[73] Assignee: General Electric Company, Schenectady, N.Y.

[21] Appl. No.: 714,254

[22] Filed: Aug. 13, 1976

[51] Int. Cl.[2] .............................................. G03B 41/16

[52] U.S. Cl. ............................ 250/315 R; 250/315 A

[58] Field of Search ........................ 250/315 R, 315 A

[56] References Cited

U.S. PATENT DOCUMENTS

| | | | |
|---|---|---|---|
| 3,932,750 | 1/1976 | Reiss | 250/315 A |
| 3,940,620 | 2/1976 | Houston | 250/315 A |

*Primary Examiner*—Craig E. Church
*Attorney, Agent, or Firm*—Geoffrey H. Krauss; Joseph T. Cohen; Jerome C. Squillaro

[57] ABSTRACT

An electrostatic X-ray image recording device having a pair of spaced electrodes with a gas-filled gap therebetween, and including discrimination means, having a conductive mesh supporting a photocathodic material, positioned in the gas-filled gap between a first electrode having a layer of ultraviolet-emitting fluorescent material and a second electrode having a plastic sheet adjacent thereto for receiving photoelectrons emitted by the photocathodic material and accelerated to the second electrode by an applied field. The photoconductor-mesh element discriminates against fast electrons, produced by direct impingement of X-rays upon the photocathode to substantially reduce secondary electron production and amplification, thereby increasing both the signal-to-noise and contrast ratios. The electrostatic image formed on the plastic sheet is developed by zerographic techniques after exposure.

12 Claims, 1 Drawing Figure

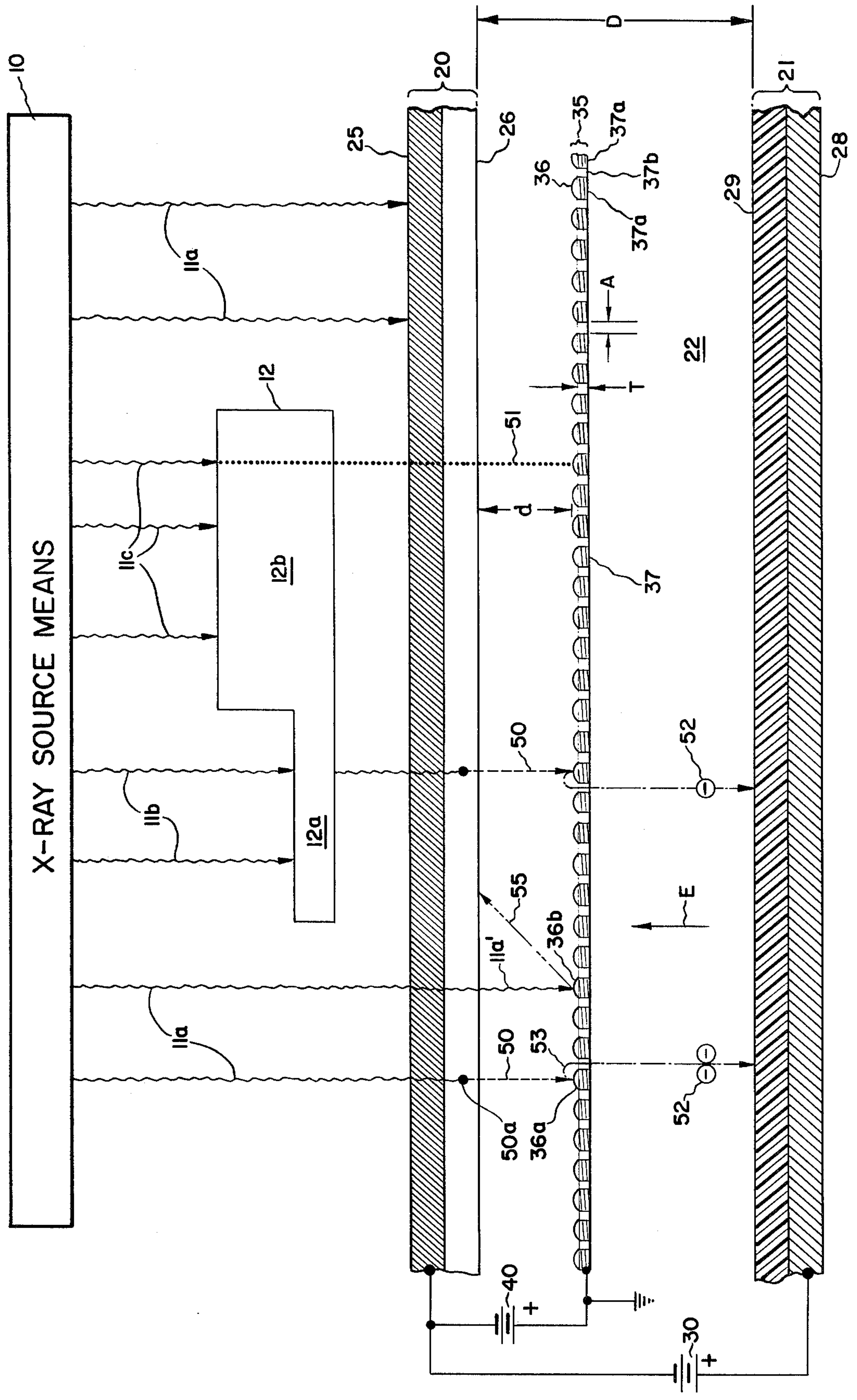
X-RAY SOURCE MEANS
10
11a
11b
11c
11a'
12
12a
12b
20
21
22
25
26
28
29
30
35
36
36a
36b
37
37a
37b
40
50
50a
51
52
53
55
D
d
A
T
E

ELECTROSTATIC X-RAY IMAGE RECORDING DEVICE WITH MESH-BASE PHOTOCATHODE PHOTOELECTRON DISCRIMINATOR MEANS

BACKGROUND OF THE INVENTION

The present invention relates to apparatus for electrostatically recording X-ray images and, more particularly, to a novel device utilizing a mesh-base photocathode photoelectron discriminator means for reducing background noise and obtaining greater contrast in such apparatus.

Apparatus for electrostatically recording X-ray images, particularly a device of the type having an air-exposable recording film which may rapidly be processed by xerographic techniques, is highly desirable to users of X-ray technology. Apparatus fulfilling these requirements is discolosed in U.S. Pat. No. 3,940,620, issued Feb. 24, 1976 and assigned to the assignee of the present invention, which discloses an electrostatic X-ray image recording device comprised of two spaced electrodes with a gas-filled gap therebetween. One of the electrodes comprises a layer of an ultraviolet emitting fluorescent material and a layer of an air-exposable ultraviolet sensitive photoemitting material thereon. A plastic sheet is positioned adjacent to the remaining electrode and an electric field is applied across the gap to accelerate photoelectrons, emitted by the photoemitting material responsive to incident vacuum-ultraviolet (VUV) photons responsive to incident X-rays, to the plastic sheet. The electrostatic image formed on the plastic sheet is then developed by xerographic techniques after exposure.

The gap between the pair of electrodes is filled with a gas which, when struck by the accelerated photoelectrons moving across the gap, generates ion-electron pairs causing amplification by an avalanche effect in the gap.

The photoemitting material is stimulated to emit electrons not only by the desired VUV photons, but also responsive to direct stimulation by X-rays passing through the phosphor layer. The direct X-ray-stimulated photoemission produces fast electrons, i.e., electrons of sufficient kinetic energy to generate secondary ion-electron pairs through ionization of the gas contained in the gap. The secondary electrons are amplified by the gas, along with the desired slow electrons, to create sufficient "noise" to reduce the available contrast ratio of electrostatic charge on the imaging sheet. The gas in the gap is normally substantially at atmospheric pressure.

One method for reducing the contribution to the "noise" due to fast electrons is to reduce the pressure of the gas in the gap whereby fewer gas molecules are available for ionization. This arrangement complicates the structure of the device as a differential pressure-sealing envelope must be provided between the electrodes and about the periphery of the gap to allow reduction of the gas pressure, and requires additional pressure-reduction means, such as a vacuum pump and the like. Further, the bulky differential-pressure-sealing means must be removed from the device to allow removal of the plastic film for subsequent development, which time consuming task negatives one of the the major efficiency factors of the air-exposable film-electrode combination.

BRIEF SUMMARY OF THE INVENTION

In accordance with the invention, an electrostatic X-ray image recording device, realizing an improved signal-to-noise ratio without requiring reduction of gas pressure in a gap between a pair of electrodes, comprises an electron-energy discriminator means, comprised of a conductive mesh having an an air-stable photocathodic material fabricated upon one surface thereof and positioned within the gas-filled gap between a first electrode having a phosphor producing ultraviolet photons responsive to incident X-ray photons and a second electrode supporting the image-receiving layer. The electrodes are biased by a source of electrical potential to form a field in the gap to accelerate electrons toward the second electrode. The mesh-supported photocathode of the discriminator means is spaced from the ultraviolet-emitting phosphor layer with a separation distance of several microns and with the photocathodic material facing the phosphor, whereby fast electrons caused by direct X-ray photoemission are insufficiently retarded by the electric field in the separation gap and will be directed away from the recording layer while relatively slow electrons, produced responsive to ultraviolet photon stimulations of the photocathode, are accelerated to the image-receiving layer.

Accordingly, it is one object of the present invention to provide electrostatic X-ray image recording device having means for the kinetic energy discrimination of photoelectrons.

It is another object of the present invention to provide an electrostatic X-ray image recording device utilizing a mesh based photocathode spaced from an ultraviolet-photon-emitting phosphor to improve the signal-to-noise and the contrast ratios of the recorded image.

These and other objects of the present invention will become apparent upon consideration of the following detailed description and of the drawing.

BRIEF DESCRIPTION OF THE DRAWING

The sole FIGURE is a sectional view schematically representing a preferred embodiment of the device in accordance with the principles of the present invention.

DETAILED DESCRIPTION OF THE INVENTION

The electrostatic X-ray recording device of FIG. 1 comprises an X-ray source 10 producing a plurality of X-rays 11 for illuminating an object 12 to be analyzed. Typically, X-rays 11 have energies in the region of 60 keV. As is well known, X-rays 11 are differentially absorbed in object 12 in accordance with the density and path length therethrough. Thus, X-rays **11*a* passing outside the boundaries of object 12 are essentially unabsorbed, while X-rays 11*b* passing through a relatively thin section 12*a* of the object are differentially absorbed to a lesser degree than X-rays 11*c* passing through a relatively thick section 12*b*** of the object.

A pair of electrodes 20 and 21 are maintained in spaced apart relationship by means (not shown) and have a gap 22 of length D between the facing interior surfaces thereof. First electrode 20 comprises a plate 25 of a light metal, e.g., aluminum and the like, substantially transparent to X-rays 11 incident thereon. The metal plate supports a layer 26 of a fluorescent phosphor material emitting ultraviolet photons, preferably in the VUV region, responsive to excitation by the X-rays and in quantity dependent upon the energy per unit area thereof received. Advantageously, layer 26 is composed of a trivalent lathanide-activated trifluoride phophor of the type described in co-pending application (RD-7706), which phosphors exhibit relatively high efficiencies for the conversion of 60 keV. X-rays to VUV photons.

Second electrode 21 comprises a layer 28 of a conductive material and a sheet 29 of insulating material, such as a polyester film and the like, positioned upon the interior surface of plate 28 and mounted in a manner whereby sheet 29 is easily removed from plate 28. A gas, substantially at atmospheric pressure, fills gap 22, whereby a differential-pressure-sealing means is not required to enclose the volume defined between first and second electrodes 20 and 21, although a gas diffusion seal may be required if a gas, such as argon and the like (rather than air), is utilized in gap 22.

A first source 30 of electrical potential is coupled between conductive layer 25 and conductive layer 28 to impart a positive potential to the latter layer with respect to the former layer, thereby applying an electric field in the direction of arrow E across gap 22.

As disclosed in the aforementioned U.S. Pat. No. 3,940,620, incorporated herein by reference, a layer of photoelectric material may be placed essentially upon the inward surface of phosphor layer 26; the photoemitting material converts the ultraviolet photons emitted by phosphor 26 to photoelectrons accelerated toward insulating sheet 29 by electrostatic acceleration in the electric field. The photoemitter material emits two distinct classes of electrons: a relatively slow electron emitted responsive to ultraviolet excitation and a relatively fast electron emitted by direct stimulation of the photoemitter by those of X-rays 11 passing through first electrode 20 without conversion to ultraviolet photons. The fast electrons have sufficient kinetic energies to generate ion-electron pairs in the gas in gap 22. The generated secondary electrons, as well as the primary slow electrons, cause an avalanche effect in the gas and are amplified. The amplified photoelectrons, of both primary slow and secondary nature, form an electric charge image on insulating layer 28, which image has a local intensity proportional to the corresponding differential absorption of X-rays 11 by object 12. The secondary electrons are created generally randomly within the gap-filling gas and contribute a random charge upon insulating sheet 29; this secondary-electron-induced "noise" lowers the signal-to-noise ratio and hence the contrast ratio of the resulting image, when the charge image on sheet 29 is subsequently developed by conventional xerographic techniques.

In accordance with the invention, I have found that the production of secondary electrons can be substantially reduced by use of a discriminator means 35 comprised of a photocathodic material 36 deposited only upon the conductive portions of a thin planar mesh member 37. The preferably photocathodic material is cesium iodide (CsI) due to the relatively high air stability thereof, although other photoconductors, such as CdTe and the like, can be used if suitably sealed off from the ambient atmosphere. An electroformed nickel mesh may form screen 37 in a manner somewhat similar to that described by G. R. Carruthers at 14 *Applied Optics* 1667 (1975). Advantageously, the separation between individual threads 37*a* of the mesh will be on the order of 25 microns, creating numerous microscopic apertures 37*b* in the thin metallic mesh which apertures have a preferred ratio of aperture diameter A to mesh thickness T on the order of less than 1:1 to about 2:1, and a preferred center-to-center spacing on the order of 40 microns. A domed deposit 36 of the photocathodic material is located only upon each thread 37*a* of the mesh.

The discriminator means is positioned parallel to first and second electrodes 20 and 21, with the deposits 36 of the photocathodic material facing first electrode 20 and having a separation distance *d*, on the order of 5 microns, between the interior surface of phosphor layer 26 and the closest point thereto of each photocathodic material deposit. Conductive mesh 37 is maintained at electrical ground potential. Advantageously, a second potential source 40 is coupled between mesh 36 and first electrode conductivelayer 25 to bias the latter layer negative with respect to the mesh. It should be understood that potential source 40 may be removed and upper electrode conductive layer 25 maintained at ground potential with substantially no difference in operation of the device, which operation is explained hereinbelow.

In operation, differentially-absorbed X-rays 11 pass through conductive layer 25 of first electrode 20, to be absorbed by the phosphor material of layer 26 and generate proportional emission of ultraviolet photons having paths of travel substantially as shown by the broken lines 50 in the figure. Assuming that portion 12*b* is fabricated of material dense enough, and a sufficient path length, to absorb substantially all X-rays 11*c* impingent thereupon, substantially none of the X-rays pass therethrough (as shown by dotted path 51, indicating an absence of X-rays impingent on phosphor layer 26 and means 35.)

The ultraviolet photons, of quantity inversely proportional to the absorption of X-rays 11 by object 12, are emitted and travel generally downwardly across separation gap *d* to impinge upon a photocathodic material deposit 36*a* below and essentially adjacent to the site 50*a* at which the ultraviolet photon was generated. Receipt of ultraviolet photons at deposit 36*a* result in generation of a plurality of photoelectrons 52, having energies equal to the energy difference between the ultraviolet photon emission energy and the bandgap energy of the photocathodic material. Illustratively, if phosphor 26 emits VUV photons with an energy of 7 Ev. and the bandgap of CsI, utilized for photocathodic material 36, is on the order of 6 Ev., the slow primary electrons 52 have energies on the order of 1 Ev.. The electric field, between upper and lower conductive layers 25 and 28, respectively, responsive to potential source 30, is of sufficient magnitude to prevent the primary slow photoelectrons, generally emitted upwardly towards phosphor layer 26, from reaching the phosphor layer. The primary slow electrons are instead accelerated along generally curved path 53 (shown in chain line) to enter the upper end of the apertures, which are essentially clear of photocathodic material. The slow electrons are accelerated through mesh apertures 37*b* and travel downwardly across gap 22, generally with avalanche amplification therein, to impinge upon the upper surfaces of plastic film 29. Illustratively, for primary slow electrons having energies on the order of 1 eV. an electric field E of magnitude on the order of 1000 volts per millimeter will prevent the primary slow electrons from reaching phosphor layer 26 if the separation gap distance is greater than about 1 micron. Thus, a separation gap distance *d* on the order of 5 microns prevents substantially all of the primary slow electrons from reaching phosphor layer 26 and will facilitate deposition of the amplified primary slow electrons upon plastic film 29.

As previously mentioned hereinabove, some of X-rays 11 travel through upper electrode 20 without absorption by the phosphor layer 26 thereof. An X-ray 11*a* ' impingent directly upon a deposit 36*b* of photocathodic material generates a photoelectron having a relatively high kinetic energy, established by the difference between the energy of the X-ray and the electron finding energy of the photocathodic material. The high energy primary fast electron is emitted from photocathodic material deposit 36b along a path 55 (in double-chain line) in a direction generally upwardly toward phosphor layer 26, as downward movement, toward second electrode 21, would cause impingement of the primary fast electron upon, and captured by, the grounded conductive mesh 37 underlying essentially all of the photocathodic material deposits; the captured fast electron is conducted to ground and does not enter that part of gap 22 between discriminator means 35 and second electrode 21. The remaining primary fast electrons, having an upward velocity component toward phosphor layer 26 have energies greater than the field energy (which is on the order of 5eV, for a field on the order of 1000 V/mm. and a separation gap distance *d* on the order of 5 microns) whereby these fast electrons pass upwardly into first electrode 20 and are generally absorbed therein, but are in any event, not subject to path-of-travel reversal toward second electrode 21. Thus, discriminator means 35 essentially provents the first primary electrons from entering the gap between the discriminator and plastic film 29, whereby sedcondary electrons are essentially neither generated nor amplified for contribution of extraneous noise to the charge image deposited upon plastic film 29, thereby facilitating a higher signal-to-noise ratio of the charge image and subsequent high contrast ratio of the xerographically developed film.

While the present invention has been described with reference to a preferred embodiment thereof, many variations and modifications will now become apparent to those skilled in the art. It is my intent, therefore, to be limited not by the preferred embodiment disclosed hereinabove, but solely by the appended claims.

What is claimed is:

1. A device for the electrostatic recording of images produced responsive to differential absorption of X-rays by an object, comprising:

a first electrode emitting light photons responsive to quanta of X-rays impinging thereupon;

a second electrode spaced from said first electrode to form a gap therebetween, said second electrode including a layer of an insulating material on a surface thereof facing said first electride;

a gas filling gap between said first and second electrode;

means for generating an electric field in the gap between said first and second electrodes; and means positioned in said gap and spaced from said first and second electrodes for emitting primary slow and fast electrons respectively responsive to impingement thereon of said light photons and at least a portion of said X-rays and for discriminating between said fast and slow electrons to allow said slow electrons to be accelerated across said gap by said electric field for deposition upon said insulating layer and to substantially prevent said fast electrons from entering the gap between said discriminator means and said second electrode.

2. A device as set forth in claim 1, wherein said discriminator means comprises a conductive mesh screen having a plurality of apertures formed therethrough, said conductive screen being maintained at a more negative electrical potential than said second electrode; and a photocathodic material deposited only upon the mesh portions of said screen member and facing said first electrode, said photocathodic material emitting photoelectrons responsive to impingement thereon of said light photons.

3. A device as set forth in claim 2, wherein said photocathodic material comprises a material selected from the group consisting of cesium iodide and cadmium telluride.

4. A device as set forth in claim 2, wherein the ratio of the diameter of said apertures to the thickness of said screen member is less than about 2:1.

5. A device as set forth in claim 2, wherein said apertures have a diameter of about 25 microns.

6. A device as set forth in claim 5, wherein said apertures have a center-to-center spacing of about 40 microns.

7. A device as set forth in claim 2, wherein the separation distance between facing surfaces of said first electrode and said first discriminator means is about 5 microns.

8. A device as set forth in claim 1, wherein said discriminator means is maintained essentially at ground electrical potential and said first means maintains said second electrode at a positive potential with respect to at least said discriminator means.

9. a device as set forth in claim 8, wherein said first means maintains said second electrode at a positive potential with respect to said first electrode.

10. A device as set forth in claim 9, further comprising second means for applying another electric field between said discriminator means and said first electrode.

11. A device as set forth in claim 1, wherein said first electrode comprises a conductive layer upon which said X-rays impinge; and a layer of a phosphor material emitting said light photons responsive to receipt of said X-rays.

12. A device as set forth in claim 11, wherein said phosphor material emits ultraviolet photons.

* * * * *